Sept. 13, 1966  B. WENDROFF  3,271,833
PRESSURE OPERATED RELEASE DEVICE
Filed Nov. 20, 1964

INVENTOR
BENJAMIN WENDROFF
BY
ATTORNEY

United States Patent Office 3,271,833
Patented Sept. 13, 1966

3,271,833
PRESSURE OPERATED RELEASE DEVICE
Benjamin Wendroff, Teaneck, N.J., assignor to Specialties Development Corporation, Belleville, N.J., a corporation of New Jersey
Filed Nov. 20, 1964, Ser. No. 412,787
4 Claims. (Cl. 24—230)

The present invention relates to fluid pressure operated devices and, more particularly, to an improved device for releasing a link connected to a cable to free the cable and allow an operation such as closing a door or window to be performed in conjunction with the discharge of fluid under pressure from a fire extinguishing system or the operation of other pressure operated systems.

Such devices heretofore in use generally comprised a stem or pin extending outwardly of a cylinder and through the link, and a piston in the cylinder and secured to the stem for retracting the same to release the link. One of the difficulties of such prior devices was that due to shock or vibration the link was released without retracting the stem, whereby the operation to be performed was performed at an improper time.

Accordingly, an object of the present invention is to provide an improved pressure operated release device which is not subject to the foregoing disadvantages.

Another object is to provide a device wherein the link is held captive by a guard until the stem is retracted.

Another object is to provide such a device which facilitates insertion of the link between the stem and the guard when the stem is extended.

Another object is to provide such a device which facilitates connection of the guard to the body of the device.

A further object is to provide such a device which is simple, and economical in construction and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein.

Figures 1, 2, 3:
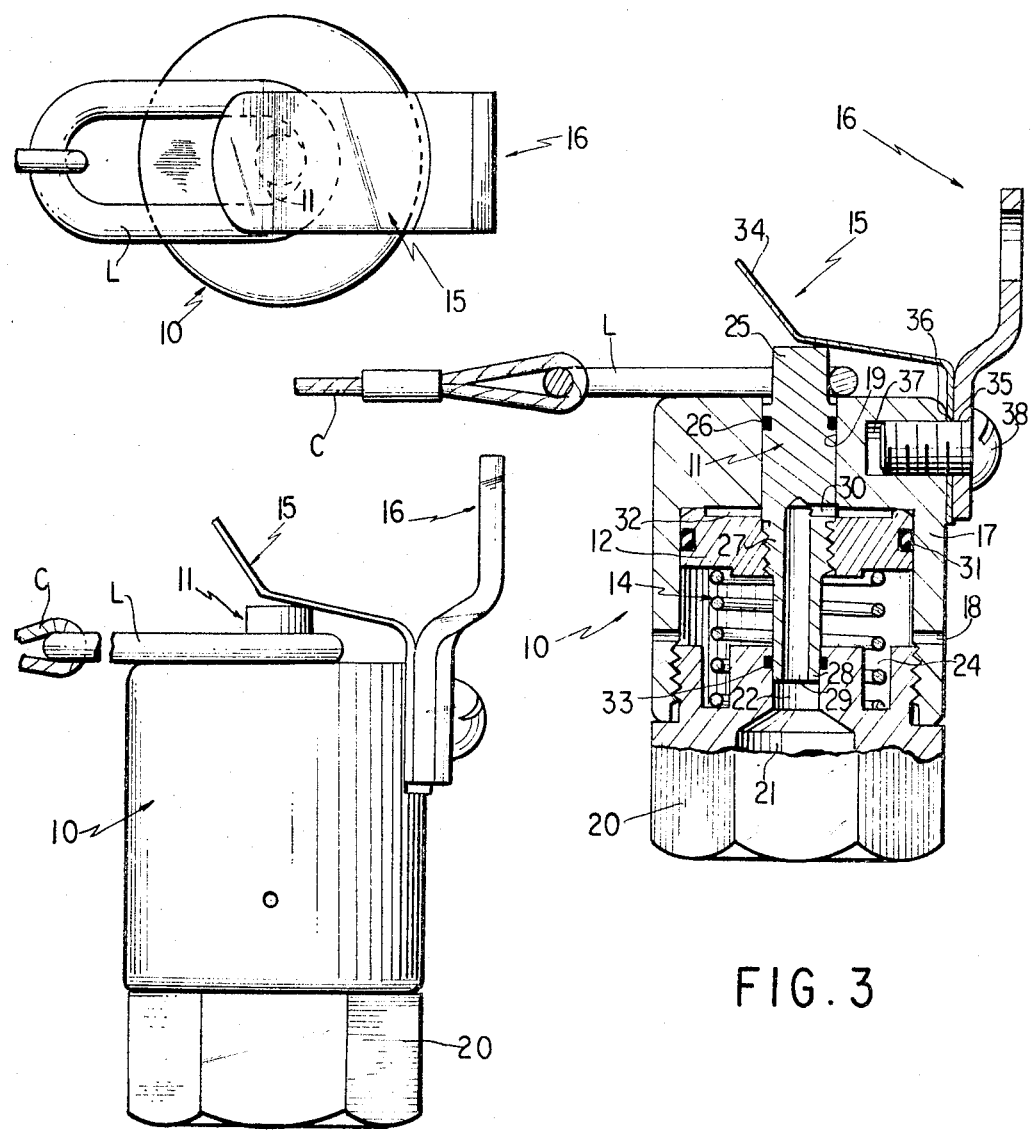
FIG. 1 is a side elevational view of a pressure operated release device in accordance with the present invention.
FIG. 2 is a top plan view of the device shown in FIG. 1.
FIG. 3 is a longitudinal sectional view of the device.

Referring now to the drawing in detail, a device is shown for releasing a link or ring L connected to a cable, rope or chain C which device generally comprises a body 10, a stem 11, a piston 12, a spring 14, a guard 15 and mounting means such as a bracket 16.

The body 10 includes an upper inverted cup-shaped member 17 providing a cylinder vented at 18 and having a central opening 19 in the upper end wall thereof for the stem 11; and a lower plug member 20 threadedly secured to the member 17 and having a central inlet bore 21 formed with an upper reduced bore portion 22 and having an annular well 24 in the upper surface thereof.

The stem 11 includes an upper portion 25 slidably mounted in the opening 19 which is adapted to project upwardly through this opening for engagement by the link L and carries an O-ring 26 for providing a seal between the stem portion 25 and the opening; an intermediate portion 27 screw threaded through the piston 12 for securement thereto; and a lower portion 28 slidably mounted in the bore portion 22. The stem further has a bore 29 extending upwardly through the lower and intermediate portions with its lower end in communication with the inlet 21 and having a side outlet 30 at its upper end above the piston 12.

The piston 12 is slidably mounted in the cylinder provided by the body member 17 and carries an O-ring 31. The upper end face of the piston has a central recess 32, and the side outlet 30 faces the recess 32 so that, when the piston engages the upper end wall of the cylinder, fluid under pressure can get above the piston to drive it downwardly and retract the upper stem portion 25.

The spring 14 has its lower end mounted in the wall 24, and has its upper end in engagement with the underside of the piston to urge the piston upwardly as shown. An O-ring 33 provides a seal between the bore 22 and the stem portion 28.

The guard 15 is formed of spring steel and in effect is a leaf spring which is biased against the upper end of the stem 11 to hold the link L captive. One end of the guard is secured to the body member 17 and its other free end extends across the upper end of the stem. Preferably, the guard has an upwardly extending portion 34 at its face end which commences at about the center of the free end of the stem to facilitate insertion of the link between the stem and the guard without retracting the piston. When the link is inserted between the upper end of the stem and the guard portion 34, the guard yields upwardly to allow the link to encircle the stem and snaps back into position to hold the link captive.

In order to effect securement of the guard 15 and bracket in a simple and convenient manner, the bracket is formed with an aperture 35, the fixed end of the guard is formed with an aperture 36, the body member 17 is formed with a threaded hole 37, and a screw 38 extends through the apertures 35 and 36 and is screwed into the hole 37.

In operation, the link L is released when fluid medium under pressure enters the cylinder above the piston by way of the inlet 21, the bore 29 and the side outlet 30 of the bore, whereby the upper portion of the stem is retracted and the link can pass between the guard 15 and the upper surface of the body member 17.

From the foregoing description, it will be seen that the present invention provides an improved pressure operated release device.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A pressure operated release device comprising a body formed with a cylinder having an opening in one end thereof, a piston slidably mounted in said cylinder having a stem secured thereto, means in said cylinder for admitting fluid medium under pressure into said cylinder to effect operation of said piston from one position to another position, said stem being extended through and outwardly of said opening when said piston is in one position to support a link connected to a cable and being retracted within said opening when said piston is in another position to release the link, and a resilient guard attached at one end on said body having a section positioned across said opening and engaged by the free end of said stem when extended to hold the link captive while said stem is extended.

2. A device according to claim 1, wherein said guard is a leaf spring.

3. A device according to claim 2, wherein said spring has an upwardly extending portion at the free end thereof commencing at the free end of said stem to facilitate insertion of the link between said stem and said guard.

4. A device according to claim 1, including a bracket having an aperture therein, said guard having an aperture therein and said body having a threaded hole, and a screw extending through said bracket aperture and said guard aperture and being screwed into said hole.

References Cited by the Examiner

UNITED STATES PATENTS

| | | | |
|---|---|---|---|
| 2,276,990 | 3/1942 | Long | 294—83 X |
| 2,839,767 | 6/1958 | Sieverts. | |
| 3,027,126 | 3/1962 | Wallace | 244—141 |
| 3,152,571 | 10/1964 | Ishihara | 294—83 X |

BERNARD A. GELAK, *Primary Examiner.*